United States Patent [19]
Auer

[11] Patent Number: 5,336,072
[45] Date of Patent: Aug. 9, 1994

[54] PRESSURIZED FLUID ASSISTED INJECTION MOLDING APPARATUS

[75] Inventor: Adam Auer, March-Holzhausen, Fed. Rep. of Germany

[73] Assignee: Peguform-Werke GmbH, Bötzingen, Fed. Rep. of Germany

[21] Appl. No.: 956,044

[22] Filed: Oct. 2, 1992

[30] Foreign Application Priority Data

Oct. 4, 1991 [DE] Fed. Rep. of Germany ......... 132986

[51] Int. Cl.$^5$ .................. B29C 45/16; B29C 49/06
[52] U.S. Cl. .................. 425/130; 264/572; 425/536; 425/564; 425/566
[58] Field of Search .............. 264/572; 425/130, 562, 425/564, 566, 535, 536

[56] References Cited

U.S. PATENT DOCUMENTS

| | | |
|---|---|---|
| 4,101,617 | 7/1978 | Friederich .................. 425/533 |
| 4,942,006 | 7/1990 | Loren .................. 264/572 |

FOREIGN PATENT DOCUMENTS

| | | |
|---|---|---|
| 0127961 | 4/1990 | European Pat. Off. . |
| 3834917 | 4/1990 | Fed. Rep. of Germany . |
| 2106546 | 8/1992 | Fed. Rep. of Germany . |

*Primary Examiner*—Tim Heitbrink
*Attorney, Agent, or Firm*—Watson, Cole, Grindle & Watson

[57] ABSTRACT

A nozzle arrangement for a fluid assisted injection molding apparatus has a central passage connected to an injection molding machine at one end and a section of the passage forming an outer sleeve at its opposite end. A channel at the opposite end of the nozzle connects the outer sleeve with an inlet runner leading to the mold cavity through which plasticized resin material can be injected. A pressurized fluid conduit coaxial with the nozzle forms an inner sleeve movable into and out of telescoping engagement with the outer sleeve for respectively blocking and opening the connection between the outer sleeve and its connecting channel. The conduit has a connecting passage, and it central passage is closed at its inner end. The connecting passage connects the conduit central passage with the nozzle connecting channel upon the telescoping engagement of the sleeves during which communication between the nozzle connecting channel and the outer sleeve is blocked while communication between that connecting channel and the inner sleeve connecting channel is established. The inlet runner is therefore alternately connected with plasticized resin with pressurized gas respectively upon the estabtishing and blocking positions.

12 Claims, 3 Drawing Sheets

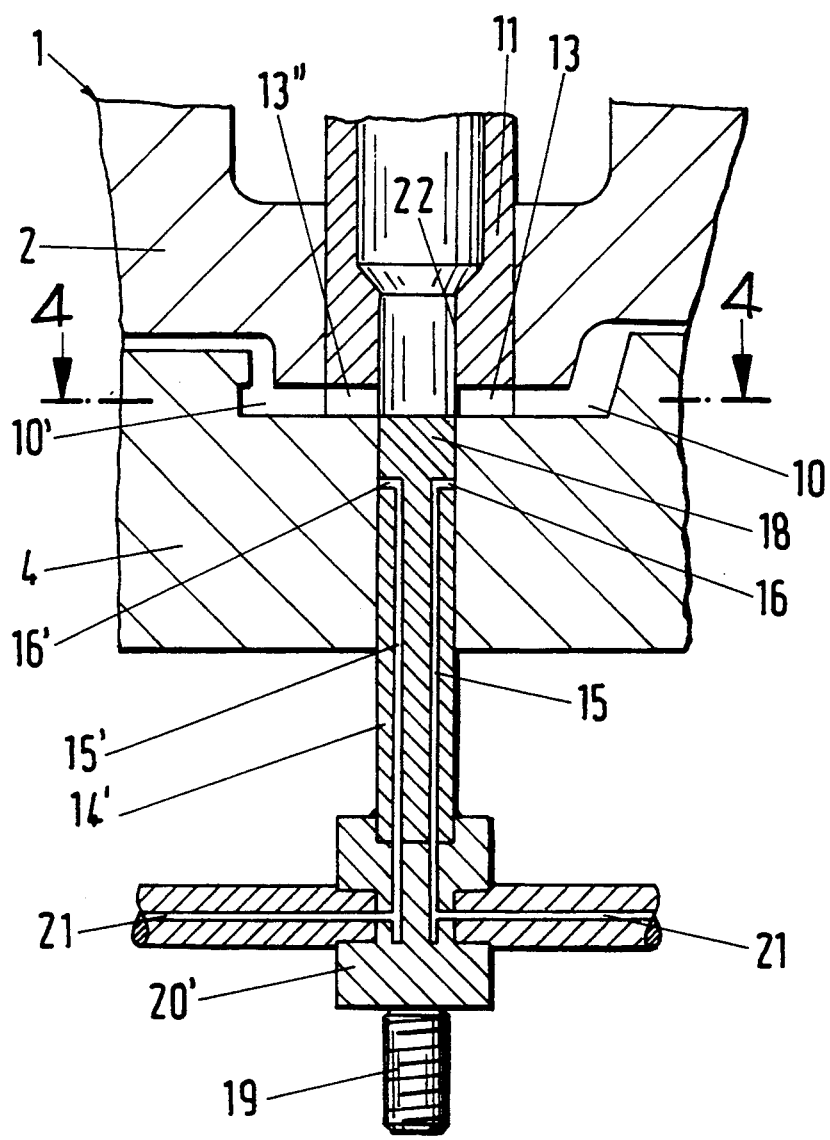
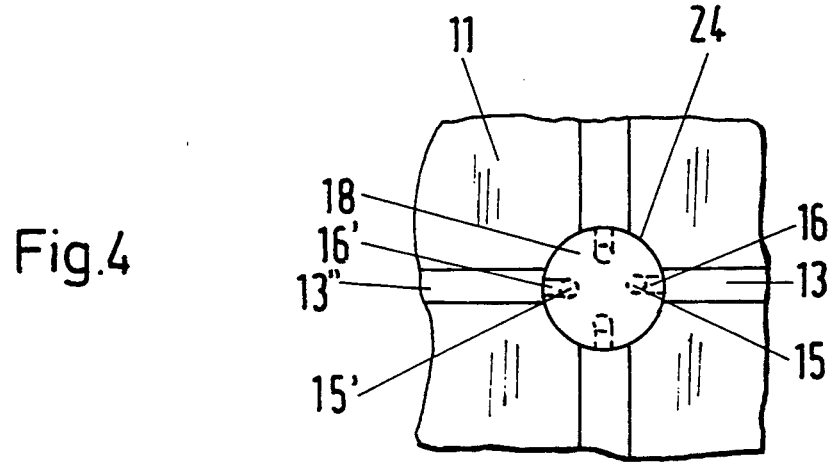
Fig.3
Fig.4

PRESSURIZED FLUID ASSISTED INJECTION MOLDING APPARATUS

BACKGROUND OF THE INVENTION

This invention relates to an injection molding system having at least one nozzle for feeding plasticized resin material into a mold cavity through an inlet runner, and a pressurized fluid conduit for distributing the resin on the walls of the mold cavity.

U.S. Pat. No. 4,101,617 and German published Patent Application No. 21 06 546 disclose methods for the injection molding of articles from thermoplastic resins. In the German application shoe heels are produced by first injecting the requisite quantity of plasticized resin from a nozzle into the mold cavity of a two-part mold, the nozzle being stationary relative to the mold. Compressed gas, such as compressed air, is then injected from a second nozzle into the center of the molten plastic of the mold cavity in order to distribute the plastic on the walls of the mold cavity. The second nozzle is separate and spaced from the first nozzle.

Upon resin solidification, the mold is opened whereby the second nozzle, which is arranged substantially perpendicular to the parting surface of the mold halves, and which is fixed to the mold and projects at a constant length into the closed mold, is removed from the shoe heel thus resulting in establishing a pressure equilibrium between the interior of the shoe heel and the surrounding atmosphere.

In the aforementioned U.S. patent, square hollow bodies such as glass bricks are produced by first injecting, by means of a concentric double nozzle, plasticized resin out of an outer annular nozzle into the mold cavity of a two-part mold, and thereafter injecting compressed gas out of the inner circular nozzle into the mold cavity. This approach can be applied both to a mold cavity with solid walls and to a mold cavity having a variable volume, and comprises a female and male mold. Finally, the single injection opening in the plastic mold can be plugged with additional plastic after solidification of the plastic in the mold cavity and prior to opening the mold, thereby requiring the plastic mold to be pierced or drilled for purposes of equalizing the pressure between the interior of the mold and the surrounding atmosphere. Otherwise, the pressure can be equalized by simply pulling back the concentric injection nozzle from the mold.

In both the above prior art systems it is possible to advance the nozzles directly as far as the mold cavity or to use at least only very short inlet runners in the mold body, and to provide compressed gas nozzles directly into the mold cavity. Thus, the plasticized resin flows from the plasticized unit into the mold cavity substantially without any cooling, whereafter the cooling and resulting solidification on the cavity walls commences.

With the mold cavity having a sufficiently large volume the injection pressure of the plasticized resin and thereafter the use of compressed gas to distribute the plastic uniformly over the walls of the mold cavity, prior to its solidification, is known. For large mold parts having a large area or only a relatively small cross-sectional area in some locations thereof, the flow resistance of the plasticized resin in the mold cavity is so great that at admissible injection pressures and temperatures the plastic cools and solidifies on the way through the mold cavity in its regions that are further away from the nozzle, before the plastic even reaches such regions. This condition cannot be corrected even with an increase of the injection pressure of the compressed gas, a feature that leads to gas breakthroughs in the walls of the incomplete plastic mold.

U.S. Pat. No. 4,942,006 discloses a system of inlet runners from a separate injection nozzle to a plurality of nozzle openings which open into individual mold cavities and which then stress each mold cavity at one or several locations simultaneously with plasticized resin. The mold having several mold cavities can be arranged side-by-side, and molds having a single mold cavity can be utilized as having a large cavity or large volume which must be supplied with plasticized resin at several points simultaneously. In order that the plasticized resin does not cool and solidify during its path of travel, which is significantly longer, from the injection nozzle to each mold cavity so that at least the production of the next plastic mold is not adversely affected, each runner is normally provided with its own heater in the mold such that all the runners form a hot runner system which maintains the requisite ease of flow of the plasticized resin as it enters the mold cavity.

A mold cavity is pressurized with pressurized fluid, for example, a compressed gas, either contemporaneously with or following the injection of the plasticized material, via a concentric needle valve, as disclosed in the U.S. Pat. No. 4,942,006. And a plurality of inlet valves can be provided which are shifted toward and away from or are fixed and totally separated from the injection nozzle openings, as disclosed in European Patent No. 127 961 and German published Patent Application No. 38 34 917.

The drawback with each of the aforementioned arrangements is that they require extensive equipment and/or control engineering measures to effect a balance between the inlet of the plasticized resin and the pressurized fluid since both components do not join until they reach the mold cavity or until shortly before reaching the mold cavity, whereby one component penetrates rearwardly into the feed region of the other component thereby possibly producing a foaming of the resin. Otherwise, such could have a negative impact on quality of the molded part, particularly on its surface finish, or even cause breakdowns in the valve arrangements at the junction of the feed systems of both components with subsequent time consuming expenses for cleaning and maintenance work.

SUMMARY OF THE INVENTION

It is an object of the present invention to provide a nozzle arrangement for a pressurized fluid assisted injection molding system such that in the closest possible vicinity of the mold cavity one feed line of a hot runner for the plasticized resin and one feed line of a pressurized fluid pipe are brought together in such a manner that with a simple and cost-effective means as possible one desired connection between pressurized feed line of one or the other of the components to the mold cavity can be effected and simultaneously the penetration of the one component into the feed system of the other is reliably prevented, whereby such a nozzle is suitable for producing simultaneously a connection between the feed of one or the other component and several mold cavities arranged side-by-side.

According to the invention the nozzle for the plasticized resin has a central passage with a section thereof forming an outer sleeve at an end of the nozzle. The nozzle has a channel at such end connecting the outer sleeve section with an inlet runner of the mold leading to the mold cavity. A pressurized fluid conduit is coaxial with the nozzle and forms an inner sleeve moveable into and out of telescoping engagement with the outer sleeve for respectively blocking and opening the connection between the nozzle outer sleeve and its channel. The conduit has a passage connected to a source of pressurized fluid, which conduit is closed at its inner end. And, the conduit has a channel connecting its central passage with the nozzle body channel upon the telescoping engagement of the sleeves, whereby the runner is alternately connected with plasticized resin or with pressurized gas respectively upon the opening and blocking of the connection between the outer sleeve and the nozzle body channel.

Such an arrangement includes only two simple components which are cost effective to produce, and require at a maximum two types of displacement drives with few stopping positions which are to be predetermined. With such an arrangement a clear distinction between both components is effective whereby due to the simple either/or switching of the nozzle by complicated pressure control for both the plasticized resin and the pressurized fluid, is avoided. Also, when the fluid type system is not also used to generate a pressure equilibrium between the interior of the mold following its solidification and the surrounding atmosphere, but rather this is carried out using a special valve or special opening device not made part of the invention. Moreover, with the nozzle arrangement according to the invention it is possible, in case of need, to fill several mold cavities which are arranged side-by-side with each provided with at least one inlet runner. Thus, both plasticized resin and pressurized fluid is injected at one point using a single nozzle configuration, a feature that further decreases the total cost of the injection molding machine.

Thus the nozzle configuration offers an additional advantage in that the nozzle is located closely adjacent the mold cavity as supported on one of the mold halves, thus the inlet runner between the nozzle and the mold cavity is of limited extent such that this short runner always contains only a defined quantity of one or the other component. And, by disposing the nozzle perpendicular to the parting surface defined between the mold halves of the mold, with the nozzle supported on one of the mold halves the entire nozzle arrangement is always accessible in a simple manner during initial assembly and maintenance.

One of the aforementioned sleeves is fixedly mounted relative to the mold cavity in or on the mold, and the other sleeve is moveable relative to the mold cavity and relative to the fixed sleeve, such that only a single displacement drive per nozzle configuration is necessary. Such drive can be provided in, on or outside the mold. Such a drive may be in the form of servo motors with suitable coupling elements, for example, thread rods or gear racks, or pneumatic or hydraulic piston and cylinder arrangements.

The pressurized fluid comprises a gas, in particular nitrogen gas, which avoids problems in maintaining the pressure due to the undesired transfer of gas and fluid, and chemical reactions are prevented from occurring between the plasticized resin and the pressurized fluid.

The outer sleeve is arranged perpendicular to the parting surface of the mold and may be fixed in the stationary half of the mold and connected to the hot runner system. The inner sleeve is activated by a displacement drive which may be located outside the moveable half of the mold and is guided along a coaxial bore in the movable half into and out of telescoping engagement with the outer sleeve, the sectional shapes of the outer and inner sleeve being similar to effect a seal therebetween. A coupling element is provided on the inner sleeve for connecting its central passage to the pressurized fluid source in a simple and thus highly economical manner while reliably preventing one component of plasticized resin or pressurized fluid from penetrating into the feed system of the other component. This simple construction is further facilitated as the displacement drive for the inner sleeve is mounted on the moving platen of the injection molding machine which supports the movable half of the mold, in the form of a hydraulic piston in cylinder arrangement, a feature that both increases the selectability of a suitable displacement drive and also improves the ease of maintenance of the entire system.

A sliding fit is effected between the sleeves which prevents the plasticized resin from penetrating into the bore of the moveable mold half along which the inner sleeve slides during its displacement.

The connecting channels of the inner and outer sleeves are coaxial when the inner sleeve is moved into telescoping engagement with the outer sleeve for blocking the connecting channel of the nozzle from the nozzle central passage. Thus only one connecting channel connects to a single inlet runner of a single mold cavity, thus simplifing the arrangement and rendering it cost effective to produce and maintain while permitting the pressure and flow properties of both the plasticized resin and the pressurized fluid in the entire region of the nozzle arrangement to be specified by a simple calculation.

According to another embodiment of the invention the outer sleeve may have several connecting channels with the inner sleeve having a plurality of connecting channels for feeding into inlet runners of side-by-side molds thereby reducing the number of nozzle arrangements, which thereby reduces investment costs and maintenance time and costs. And, with the inner and outer sleeves lying perpendicular to the Darting surface of the mold halves, gives rise to space savings and production costs savings as well as efficiency and cost reduction and maintenance. The connecting channels of the inner sleeve may be associated with individual axial fluid passages or with a single fluid passage, without departing from the invention.

BRIEF DESCRIPTION OF THE DRAWINGS

FIG. 3 is a view similar to FIG. 1 at a slightly enlarged scale of another embodiment according to the invention; and FIG. 4 is a fragmentary view taken substantially along the line A—A of FIG. 3.

DETAILED DESCRIPTION OF THE INVENTION

Figure 1:
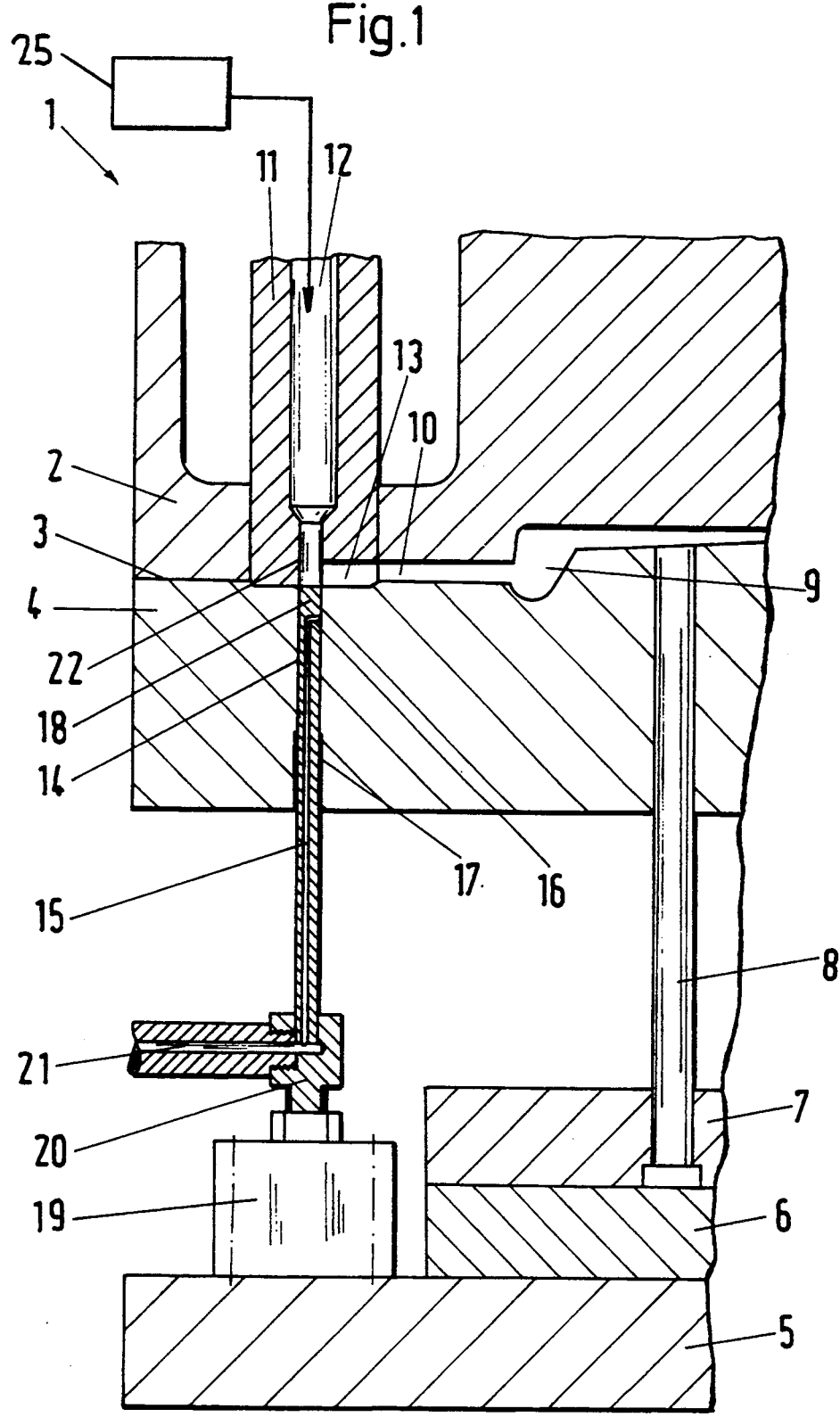
FIG. 1 is a vertical sectional view showing a part of the injection molding machine with the nozzle arrangement according to the invention.

In FIG. 1 a mold 1 of an injection molding machine is shown having a stationary mold half 2 and an opposing movable mold half 4 defining a parting surface 3 with the stationary mold half. The movable mold half is connected via a supporting element (not shown) force-lockingly to a platen 5 which is movable and which supports, in addition to movable mold half 4, a known type of ejector mechanism which comprises an ejector retaining plate 6, an ejector plate 7 and an ejector 8. The mold halves enclose a mold cavity 9 injected with plasticized resin and with pressurized fluid, preferably pressurized nitrogen gas, via an inlet runner 10, and optionally via other such runners (not shown).

The mold cavity is supplied with plasticized resin material by a nozzle 11 having a hollow nozzle body with a central passage 12 connected at one end to an injection molding machine 25. The nozzle is securely connected at its opposite end to stationary half 2 of the mold, a section of central passage 12 forming an outer sleeve 22 at such opposite end of the nozzle.

Further, the nozzle has a connecting channel 13 which connects its central passage 12 with inlet runner 10 of known type leading to cavity 9. The nozzle is, as shown, located at parting surface 3 formed between the mold halves and lies perpendicular to that surface.

And, the mold cavity is supplied with a pressurized fluid via an inner sleeve 14 having a central passage 15 which may be concentric to the longitudinal axis of the inner sleeve but which is blocked at its inner end 18 so that the central channel does not fully extend between opposite ends of the inner sleeve, as shown.

The inner sleeve has a connecting channel 16 which extends from central channel 15 and intersects with the outer surface of the inner sleeve. Sleeve 14 is axially movable along a through bore 17 provided in movable half 4 of the mold, and is coupled at its opposite end to the piston of a displacement drive 19 supported on platen 5. The displacement drive may be in the form of a hydraulic piston and cylinder arrangement.

The lower end of inner sleeve 14 is connected to a coupling element 20 which connects central passage 15 to a fluid pipe 21 extending from a source of pressurized fluid (not shown) such as nitrogen gas. Element 21 is coupled to the displacement drive for thereby transmitting drive motion to the inner sleeve.

The outer diameter of inner sleeve 14 substantially corresponds to the inner diameter of outer sleeve 22 in size and shape so as to effect a sealed telescoping interengagement between the inner and outer sleeves upon axial movement of the inner sleeve.

As shown in FIG. 1, connecting channel 13 intersects with the lower end wall of the nozzle, and that lower end is seated within a shallow recess at parting surface 3 of the movable mold half 4, inlet runner 10 being located at the parting surface in stationary half 2 of the mold. Thus, both channels 10 and 13 are formed as grooves which may have a predetermined cross section such as semicircular, triangular, square or rectangular. However, connecting channel 16 is formed as a normal bore hole.

When the ejection molding machine is operating, with the inner sleeve located in its retracted position of FIG. 1, a predetermined quantity of plasticized resin is injected via central passage 12, connecting channel 13 and inlet runner into mold cavity 9, such that this quantity must be sufficient to produce the intended plastic molded part, to the extent the complete filing and subsequent blowing out of an excess quantity of residue is not provided in a side cavity of the mold.

Thereafter, inner sleeve 14 is axially shifted by displacement drive 19 into outer sleeve 22 in telescoping relationship so as to block communication between connecting channel 13 and outer sleeve 22 while establishing communication between connecting channel 13 and central passage 15 via connecting channel 16 which opens into channel 13. Pressurized fluid can therefore be blown into (against) the plasticized resin in the mold cavity via fluid pipe 21, channel 15, connecting channel 16, connecting channel 13 and runner 10, whereby the residual quantity of plasticized resin in connecting channel 13 and runner 10 is transported by the pressurized fluid into the mold cavity. And, a distinct separation between the plasticized resin and the pressurized fluid is effected. Interaction between the plasticized resin and the pressurized fluid takes place only in an intended manner within the mold cavity.

Figure 2:
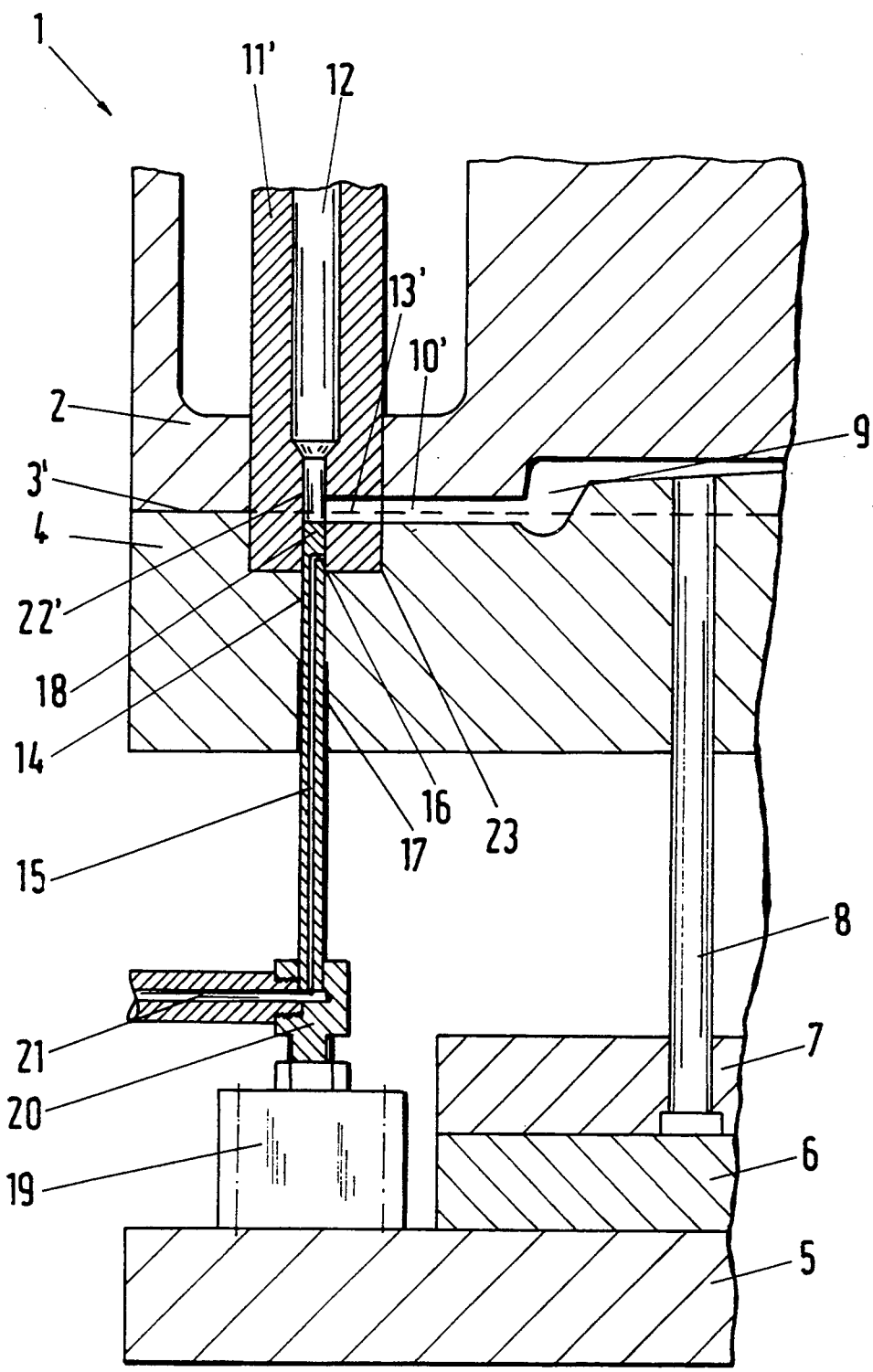
FIG. 2 is a view similar to FIG. 1 having a modified nozzle configuration.

In the FIG. 2 embodiment the arrangement of nozzle 11' differs slightly from the arrangement of FIG. 1 in that the nozzle is slightly elongated at its bottom end which extends into a deeper recess 23 in moveable half 4 of the mold so that parting surface 3' and inlet runner 10' (which is defined by grooves formed in both mold halves at the parting surface) are located above the lower end of the nozzle. In the closed condition of the mold halves shown in the drawing, runner 10' can be formed as having a circular cross-section in alignment with connecting channel 13' which may be formed as a conventional bore hole and which may be concentric with parting surface 3'.

During injection of the plasticized resin into mold cavity 9 the inner sleeve is already in sealed telescoping engagement with outer sleeve 22' although sleeve 22' is in communication with connecting channel 13' as shown. Otherwise, injection of the plasticized resin and pressurized gas, as the runner is alternately connected with the resin or the gas respectively upon the opening and blocking of the connection between the outer sleeve and channel 13', is the same as described with reference to FIG. 1.

In FIG. 3, inner sleeve 14' of the nozzle arrangement has four connecting channels 16, 16' respectively connected to separate passages 15, 15' which are likewise blocked as at 18 similarly as in the FIGS. 1 and 2 embodiments. At the lower end of the inner sleeve passages 15, 15' communicate with passages in coupling element 20' which connects these passages 15, 15' to fluid pipes 21. One or more of the channels 15, 15' can be switched open from the pressurized source by the provision of some suitable switching element, not shown.

Outer sleeve 22 of the nozzle is provided with connecting channels 13, 13" corresponding in number to that of connecting channel 16, 16' to establish communication with outer sleeve 22 and the corresponding number of inlet runners 10, 10'. The runners lead to either several mold cavities, separately arranged side-by-side, or to a single mold cavity.

In FIG. 4 only pairs of passages 15, 15', connecting channel 16, 16' and connecting channels 13, 13' are referenced for the sake of clarity. And, it should be pointed out that connecting channels 16, 16' can be associated with a single air supply passage 15 or 15'. Moreover, it can be seen in FIG. 4 that the cross-section of inner sleeve 14' is circular and fits within a corresponding circular bore 24 located in movable mold half 4 such as to effect a snug sealing engagement between the two parts. And, with some suitable switching arrangement (not shown) one or more passages 15, 15' can be connected with the pressurized gas source for independently or together injecting pressurized gas into a mold cavity or cavities, as desired. Otherwise, the operation of the runner or runners with plasticized resin or with pressurized gas respectively upon the opening and blocking of the connection between the outer sleeve and a connecting channel or channels 13, is the same as described with reference to FIG. 1.

Obviously, many other modifications and variations of the invention are made possible in the light of the above teachings. It is therefore to be understood that within the scope of the appended claims the invention may be practiced otherwise than as specifically described.

What is claimed:

1. A fluid assisted injection molding apparatus, comprising a mold that defines a mold cavity and an inlet runner leading to the mold cavity; a nozzle comprising a nozzle body having a central passage connected at one end to an injection molding machine, a section of said central passage at an opposite end of said nozzle body forming an outer sleeve, said nozzle body providing a channel at said opposite end through which plasticized resin material can be injected into the mold cavity, the channel connecting the central passage with the inlet runner, said outer sleeve extending at an angle to said channel; a pressurized fluid conduit which is coaxial with said nozzle body and includes an inner sleeve movable into and out of said outer sleeve of said nozzle for respectively blocking and establishing communication between said outer sleeve and said nozzle body channel, said conduit having a central passage connected at one end to a source of pressurized fluid, said conduit being closed at an opposite end, a channel in said conduit connecting the central passage thereof with the nozzle body channel upon blocking communication between the outer sleeve and the nozzle body channel, said channel extending at an angle relative to said central passage; means for axially shifting said conduit into and out of said outer sleeve, and said sleeves being of substantially like cross-section to effect snug engagement, whereby the inlet runner is alternately supplied with plasticized resin from said nozzle or with pressurized gas from said conduit upon the respective opening and blocking of communication between said outer sleeve and said nozzle body channel.

2. The apparatus according to claim 1, wherein said mold comprises cooperating mold halves, said nozzle being supported on one of said mold halves adjacent said inlet runner.

3. The apparatus according to claim 1, wherein said mold comprises cooperating mold halves defining a parting surface therebetween, said nozzle being supported in one of said mold halves perpendicular to said parting surface adjacent said inlet runner.

4. The apparatus according to claim 1, wherein said mold comprise cooperating mold halves, one of said sleeves being fixedly mounted on one of said mold halves, and the other of said sleeves being mounted for axial movement in the other of said mold halves.

5. The apparatus according to claim 1, wherein said means for axially shifting said conduit is located within said mold.

6. The apparatus according to claim 1, wherein said means for axially shifting said conduit comprises a piston and cylinder arrangement.

7. The apparatus according to claim 1, wherein the fluid comprises a gas.

8. The apparatus according to claim 7, wherein the gas comprises nitrogen gas.

9. The apparatus according to claim 1, wherein the mold comprises a pair of cooperating mold halves defining a parting surface therebetween, one of said mold halves being stationary and the other of said mold halves being movable relative thereto, the other sleeve being fixedly mounted on said one mold half perpendicular to said parting surface, said means for axially shifting said conduit being located outside said other mold half, said other mold half having a bore receiving said conduit in sliding engagement, a coupling element at said one end of said conduit connecting the pressurized fluid source with the conduit central passage, the coupling being shifted with said conduit by said shifting means.

10. The apparatus according to claim 1, wherein the mold comprises a pair of cooperating mold halves, one of said halves being stationary and the other of said halves being movable relative thereto, the system further comprising a movable platen to which the other of said halves is mounted to effect movement relative to said one half, said shifting means being mounted on said platen.

11. The apparatus according to claim 1, wherein the molding system comprises a plurality of molds each having a mold cavity and an inlet runner leading to each cavity, said nozzle body having a plurality of connecting channels at said opposite end thereof, said conduit having a plurality of passages connected at said one end to said source, and a plurality of channels in said conduit connecting the passages thereof with the nozzle body channel upon the engagement of the sleeves.

12. The apparatus according to claim 1, including a plurality of channels which are parallel to a central axis of the nozzle, and the plurality of channels lie perpendicular to said central axis.

* * * * *